(12) United States Patent
Bothen

(10) Patent No.: US 6,172,599 B1
(45) Date of Patent: Jan. 9, 2001

(54) REMOTE VEHICULAR ALARM

(76) Inventor: Nicholas J. Bothen, 3689 15 Road Rural Route 1, Saint Anns, Ontario (CA), L0R 1Y0

(*) Notice: Under 35 U.S.C. 154(b), the term of this patent shall be extended for 0 days.

(21) Appl. No.: 09/267,015

(22) Filed: Mar. 11, 1999

(51) Int. Cl.⁷ .................................................. B60R 25/10
(52) U.S. Cl. ............................................................ 340/426
(58) Field of Search .................................. 340/426, 525, 340/539; 307/10.2

(56) References Cited

U.S. PATENT DOCUMENTS

| | | | |
|---|---|---|---|
| 5,612,668 | * 3/1997 | Scott | 340/426 |
| 5,616,966 | * 4/1997 | Fischer et al. | 340/426 |
| 5,739,747 | * 4/1998 | Flick | 340/426 |
| 5,818,330 | * 10/1998 | Schweiger | 340/426 |
| 5,870,020 | * 2/1999 | Harrison, Jr. | 340/426 |
| 5,889,472 | * 3/1999 | Nagel et al. | 340/426 |
| 5,973,592 | * 10/1999 | Flick | 340/426 |

* cited by examiner

*Primary Examiner*—Jeffery A. Hofsass
*Assistant Examiner*—John Tweel, Jr.

(57) ABSTRACT

A vehicular alarm system is provided including at least one vehicle sensor adapted for generating an activation signal upon the detection of the infiltration of a vehicle. Also included is a control unit positioned within the vehicle. The control unit is connected to the sensor and is adapted for transmitting an alarm signal via free space upon the receipt of the activation signal from sensor. Next provided is a portable remote unit having an indicator mounted thereon for generating an indication upon the actuation thereof. The remote unit serves to actuate the indicator upon the receipt of the alarm signal via free space from the control unit.

2 Claims, 2 Drawing Sheets

REMOTE VEHICULAR ALARM

BACKGROUND OF THE INVENTION

1. Field of the Invention

The present invention relates to vehicular alarms and more particularly pertains to a new remote vehicular alarm for alerting a remote user of the infiltration of a vehicle.

2. Description of the Prior Art

The use of vehicular alarms is known in the prior art. More specifically, vehicular alarms heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,665,379; U.S. Pat. No. 4,438,426; U.S. Pat. No. 4,794,368; U.S. Pat. No. 4,296,402; U.S. Pat. No. 5,708,308; and U.S. Pat. Des. No. 303,080.

In these respects, the remote vehicular alarm according to the present invention substantially departs from the conventional concepts and designs of the prior art, and in so doing provides an apparatus primarily developed for the purpose of alerting a remote user of the infiltration of a vehicle.

SUMMARY OF THE INVENTION

In view of the foregoing disadvantages inherent in the known types of vehicular alarms now present in the prior art, the present invention provides a new remote vehicular alarm construction wherein the same can be utilized for alerting a remote user of the infiltration of a vehicle.

The general purpose of the present invention, which will be described subsequently in greater detail, is to provide a new remote vehicular alarm apparatus and method which has many of the advantages of the vehicular alarms mentioned heretofore and many novel features that result in a new remote vehicular alarm which is not anticipated, rendered obvious, suggested, or even implied by any of the prior art vehicular alarms, either alone or in any combination thereof.

To attain this, the present invention generally comprises a plurality of vehicle sensors including a plurality of door sensors each mounted on a door of a vehicle. The vehicle sensors are adapted to generate an activation signal upon the detection of at least one of the doors being opened. Associated therewith is a trunk sensor mounted on a trunk of the vehicle and adapted to generate the activation signal upon the detection of the opening of the trunk. A hood sensor is mounted on a hood of the vehicle and is adapted to generate the activation signal upon the detection of the opening of the hood. Mounted within the vehicle is a horn for emitting an audible alarm upon the actuation thereof. A battery is also situated within the vehicle beneath the hood thereof for powering purposes. FIG. 1 shows a control unit including a housing having a substantially rectangular configuration with a top face, a bottom face, and a periphery formed therebetween. Such periphery is defined by a pair of elongated side faces and a pair of short end faces. As shown in FIG. 4, the top face of the control unit has a pair of brackets mounted thereon and extending therefrom beyond the end faces for being secured to a dash of the vehicle. One of the side faces of the control unit has a light adapted to illuminate upon the actuation thereof. The control unit is connected to the sensors, the horn, and the battery. In use, the control unit is adapted for transmitting an alarm signal via free space and actuate the horn upon the receipt of the activation signal from at least one of sensors. With reference now to FIGS. 2 & 3, a remote unit is provided including a housing with a substantially rectangular configuration. The housing of the remote unit is defined by a top face, a bottom face, and a thin periphery formed therebetween defined by a pair of elongated side faces and a pair of short end faces. One of the end faces of the remote unit has a key mechanism coupled thereto and extended therefrom in perpendicular relationship therewith. Such key mechanism is adapted for opening one of the doors of the vehicle. Another one of the end faces of the remote unit has an eyelet coupled thereto for securing keys thereon. The top face of the remote unit has a speaker mounted thereon for emitting an audible alarm upon the actuation thereof. In use, the remote unit serves to actuate the speaker upon the receipt of the alarm signal via free space, thereby affording a remote indication that the vehicle has been infiltrated.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new remote vehicular alarm apparatus and method which has many of the advantages of the vehicular alarms mentioned heretofore and many novel features that result in a new remote vehicular alarm which is not anticipated, rendered obvious, suggested, or even implied by any of the prior art vehicular alarms, either alone or in any combination thereof.

It is another object of the present invention to provide a new remote vehicular alarm which may be easily and efficiently manufactured and marketed.

It is a further object of the present invention to provide a new remote vehicular alarm which is of a durable and reliable construction.

An even further object of the present invention is to provide a new remote vehicular alarm which is susceptible of a low cost of manufacture with regard to both materials and labor, and which accordingly is then susceptible of low prices of sale to the consuming public, thereby making such remote vehicular alarm economically available to the buying public.

Still yet another object of the present invention is to provide a new remote vehicular alarm which provides in the apparatuses and methods of the prior art some of the advantages thereof, while simultaneously overcoming some of the disadvantages normally associated therewith.

Still another object of the present invention is to provide a new remote vehicular alarm for alerting a remote user of the infiltration of a vehicle.

Even still another object of the present invention is to provide a new remote vehicular alarm that includes at least one vehicle sensor adapted for generating an activation signal upon the detection of the infiltration of a vehicle. Also included is a control unit positioned within the vehicle. The control unit is connected to the sensor and is adapted for transmitting an alarm signal via free space upon the receipt of the activation signal from sensor. Next provided is a portable remote unit having an indicator mounted thereon for generating an indication upon the actuation thereof. The remote unit serves to actuate the indicator upon the receipt of the alarm signal via free space from the control unit.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
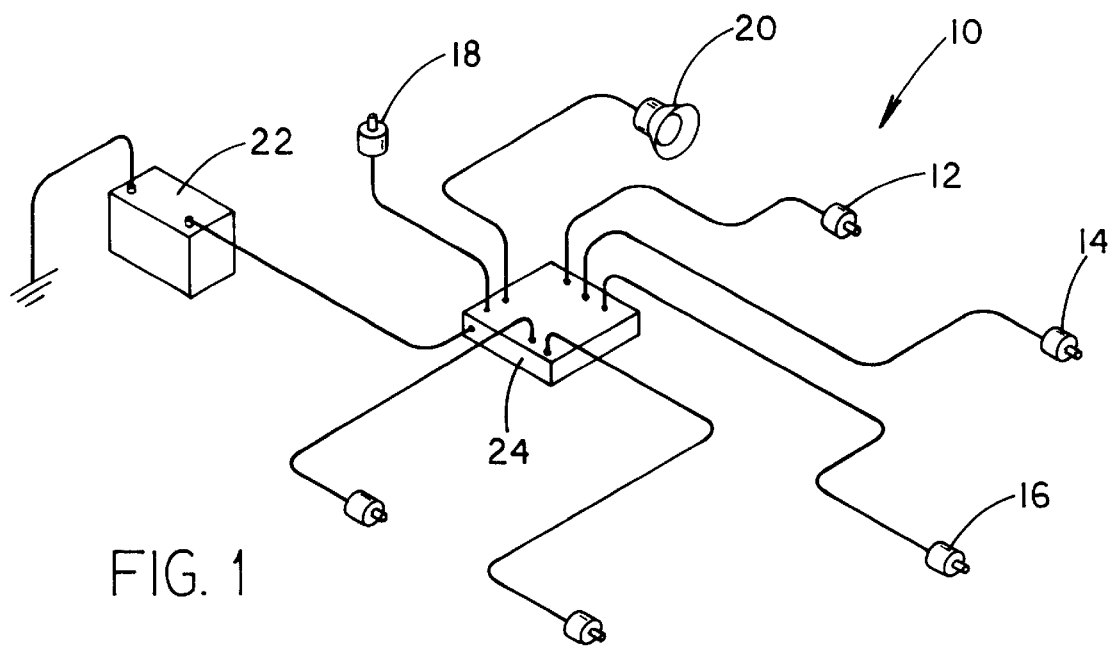
FIG. 1 is a layout of a new remote vehicular alarm according to the present invention.

With reference now to the drawings, and in particular to FIGS. 1 through 4 thereof, a new remote vehicular alarm embodying the principles and concepts of the present invention and generally designated by the reference numeral 10 will be described.

The present invention, designated as numeral 10, includes a plurality of vehicle sensors 12 including a plurality of door sensors 14 each mounted on a door of a vehicle. The vehicle sensors are adapted to generate an activation signal upon the detection of at least one of the doors being opened. Associated therewith is a trunk sensor 16 mounted on a trunk of the vehicle and adapted to generate the activation signal upon the detection of the opening of the trunk. A hood sensor 18 is mounted on a hood of the vehicle and is adapted to generate the activation signal upon the detection of the opening of the hood.

Mounted within the vehicle is a horn 20 for emitting an audible alarm upon the actuation thereof. A battery 22 is also situated within the vehicle beneath the hood thereof for powering purposes.

Figure 4:
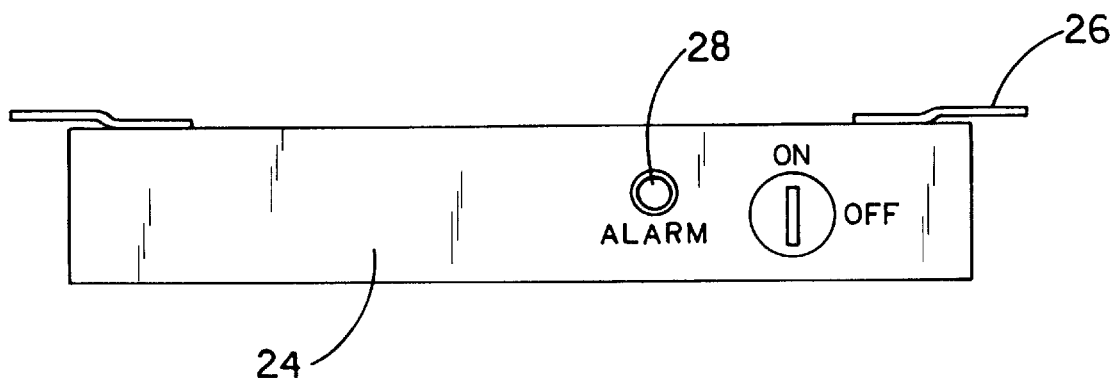
FIG. 4 is a side view of the control unit of the present invention.

FIG. 1 shows a control unit 24 including a housing having a substantially rectangular configuration with a top face, a bottom face, and a periphery formed therebetween. Such periphery is defined by a pair of elongated side faces and a pair of short end faces. As shown in FIG. 4, the top face of the control unit has a pair of brackets 26 mounted thereon and extending therefrom beyond the end faces for being secured beneath a dash of the vehicle. One of the side faces of the control unit has a light 28 adapted to illuminate upon the actuation thereof. The control unit is connected to the sensors, the horn, and the battery. In an operating mode, the control unit serves for both transmitting an alarm signal via free space and actuating the horn upon the receipt of the activation signal from at least one of sensors. Ideally, the control unit is also connected to the locks of the doors, hood, or trunk. As such, the control unit is adapted to respond to the activation signals only if the door, hood, or trunk is locked.

To indicate that the control unit is in such operating mode, the light of the control unit is actuated. As an option, a key lock may be positioned on the side face of the housing of the control unit adjacent to the light of the control unit. Such key lock may be used to switch the control unit between an operational and an unoperational mode, or merely power on or power off the same.

Figure 2:
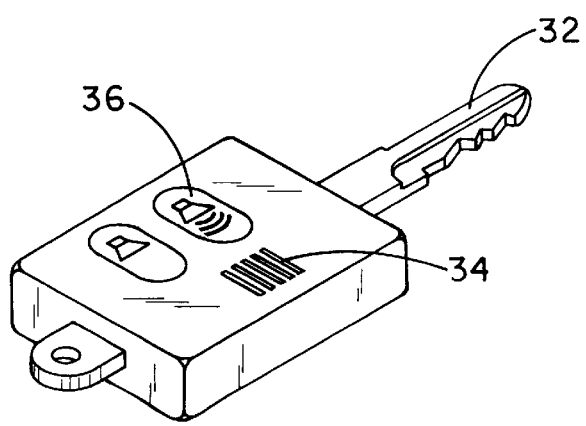
FIG. 2 is a top perspective view of the remote unit of the present invention.
Figure 3:
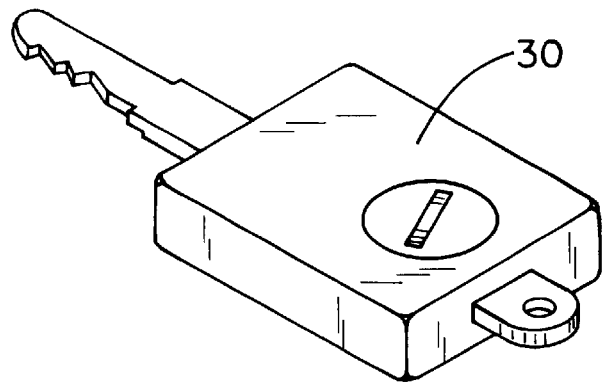
FIG. 3 is a bottom perspective view of the remote unit of the present invention.

With reference now to FIGS. 2 & 3, a remote unit 30 is provided including a housing with a substantially rectangular configuration. The housing of the remote unit is defined by a top face, a bottom face, and a thin periphery formed therebetween defined by a pair of elongated side faces and a pair of short end faces. One of the end faces of the remote unit has a key mechanism 32 coupled thereto and extended therefrom in perpendicular relationship therewith. Such key mechanism is adapted for opening one of the doors of the vehicle. Another one of the end faces of the remote unit has an eyelet coupled thereto for securing keys thereon. The top face of the remote unit has a speaker 34 mounted thereon for emitting an audible alarm upon the actuation thereof. In use, the remote unit serves to actuate the speaker upon the receipt of the alarm signal via free space within a range of 1–3 miles, thereby affording a remote indication that the vehicle has been infiltrated.

As an option, a pair of push button momentary switches 36 may be positioned on the top face of the housing of the remote unit. In use, the push button momentary switches may be designed to remotely switch the control unit between the operational and unoperational mode. In the alternative, the push button momentary switches may be designed to selectively control whether or not the horn of the vehicle sounds when actuated. To accomplish this, the remote unit would require not only a receiver, but also a transmitter. It should be noted that the present invention may be installed in the vehicle at the time of manufacture or as an aftermarket item.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicular alarm system comprising, in combination:

a plurality of vehicle sensors including a plurality of door sensors each mounted on a vehicle and adapted to generate an activation signal upon the detection of at least one of the doors being opened, a trunk sensor mounted on a trunk of the vehicle and adapted to generate the activation signal upon the detection of the opening of the trunk, and a hood sensor mounted on a hood of the vehicle and adapted to generate the activation signal upon the detection of the opening of the hood;

a horn mounted within the vehicle beneath the hood thereof for emitting an audible alarm upon the actuation thereof;

a battery situated within the vehicle beneath the hood thereof for powering purposes;

a control unit including a housing having a substantially rectangular configuration with a top face, a bottom face, and a periphery formed therebetween defined by a pair of elongated side faces and a pair of short end faces, the top face of the control unit having a pair of brackets mounted thereon and extending therefrom beyond the end faces for being secured to a dash of the vehicle, the control unit connected to the sensors, the horn, and the battery and adapted for transmitting an alarm signal via free space and actuating the horn upon the receipt of the activation signal from at least one of the sensors; and a remote unit including a housing with a substantially rectangular configuration defined by a top face, a bottom face, and a thin periphery formed therebetween defined by a pair of elongated side faces and a pair of short end faces, one of the end faces of the remote unit having a key mechanism coupled thereto and extending therefrom in perpendicular relationship therewith for opening one of the doors of the vehicle, another one of the end faces of the remote unit having an eyelet coupled thereto for securing keys thereon, the top face of the remote unit having a speaker mounted thereon for emitting an audible alarm upon the actuation thereof, the remote unit adapted to actuate the speaker upon the receipt of the alarm signal via free space from the control unit;

one of the said side faces of the control unit having a light adapted for illuminating upon the actuation thereof;

a key lock being positioned on the housing of the control unit, the key lock being used to switch the control unit between an operational and an inoperational mode such that the user is required to have a key to actuate the key lock to thereby avoid unauthorized changes of the modes;

a pair of push button momentary switches located on the housing of the remote unit, said push button momentary switches being adapted to selectively control whether or not the control unit actuates the horn of the vehicle upon receipt of an actuation signal by the control unit.

2. A vehicular alarm system comprising:

at least one vehicle sensor adapted for generating an activation signal upon the detection of the infiltration of a vehicle;

a control unit positioned within the vehicle, the control unit connected to the sensor and adapted for transmitting an alarm signal via free space upon the receipt of the activation signal from the sensor;

a portable remote unit having an indicator mounted thereon for generating an indication upon the actuation thereof, the remote unit adapted to actuate the indicator upon the receipt of the alarm signal via free space from the control unit;

a horn mounted in the vehicle for emitting an audible alarm upon the actuation thereof, the control unit being adapted for actuating the horn upon the receipt of the activation signal from the sensor;

a plurality of the vehicle sensors including a plurality of door sensors each mounted on the vehicle and adapted to generate the activation signal upon the detection of at least one of the doors being opened, a trunk sensor mounted on a trunk of the vehicle and adapted to generate the activation signal upon the detection of the opening of the trunk, and a hood sensor mounted on a hood of the vehicle and adapted to generate the activation signal upon the detection of the opening of the hood;

wherein the remote unit includes a housing having a key mechanism coupled thereto and extending therefrom for opening doors of the vehicle; and wherein the indicator of the remote unit is a speaker and the indication is an audible indication;

a key lock being positioned on the housing of the control unit, the key lock being used to switch the control unit between an operational and an inoperational mode such that the user is required to have a key to actuate the key lock to thereby avoid unauthorized changes of the modes;

a pair of push button momentary switches located on the housing of the remote unit, said push button momentary switches being adapted to selectively control whether or not the control unit actuates the horn of the vehicle upon receipt of an actuation signal by the control unit.

* * * * *